United States Patent Office 3,230,259
Patented Jan. 18, 1966

3,230,259
PREPARATION OF o-PHENYLENEDIAMINES
Joseph Levy, Paramus, N.J., assignor to Universal Oil Products Company, Des Plaines, Ill., a corporation of Delaware
No Drawing. Filed Apr. 9, 1963, Ser. No. 271,573
6 Claims. (Cl. 260—580)

This invention relates to a process for the preparation of o-phenylenediamine and derivatives thereof. More particularly, the invention is concerned with an improvement in the process for preparing o-phenylenediamine, whereby high yields of the desired product are obtained thereby.

Heretofore the conversion of a nitroaniline and particularly ortho-nitroaniline to the corresponding phenylenediamine has been accomplished by chemical, electrolytic and catalytic reduction procedures. For example, ortho-nitroaniline has been chemically reduced utilizing zinc in an ethanolic sodium hydroxide solution to give an 85% yield of the diamine. Sodium sulfide also has been used as the reducing agent. However, both of the above methods present difficulties in isolating and purifying the desired diamine. In addition to the above methods, the prior art has also disclosed that o-phenylenediamine can be obtained in approximately 85% yield by catalytically reducing o-nitroaniline using a Raney nickel catalyst in an alcoholic solution. The use of organic solvents such as the alcohols when catalytically reducing o-nitroaniline to form o-phenylenediamine has inherent disadvantages, one disadvantage being economic in nature due to the cost of the solvent and in addition, there are well known hazards involved when hydrogenating nitro compounds utilizing low boiling solvents. The process may then become economically unfeasible or commercially unattractive to operate.

It is therefore an object of this invention to provide an improved process for the preparation of o-phenylenediamines.

A further object of this invention is to prepare o-phenylenediamine by reducing o-nitroaniline under certain conditions hereinafter set forth in greater detail whereby high yields of the product can be obtained.

Taken in its broadest aspect one embodiment of this invention resides in a process for the production of an o-phenylenediamine which comprises treating an o-nitroaniline with hydrogen at reducing conditions in an aqueous alkaline medium in the presence of a hydrogenation catalyst comprising a noble metal of Group VIII of the Periodic Table, and recovering the desired o-phenylenediamine.

A further embodiment of this invention is found in a process for the production of o-phenyldiamine which comprises treating o-nitroaniline with hydrogen at a temperature in the range of from about 70° to about 100° C. and at a pressure in the range of from about 15 to about 1,000 pounds per square inch in an alkaline medium in the presence of a hydrogenation catalyst comprising a noble metal of Group VIII of the Periodic Table, and recovering the desired o-phenylenediamine.

A specific embodiment of this invention resides in a process for the production of o-phenylenediamine which comprises treating o-nitroaniline with hydrogen at a temperature in the range of from about 70° to about 100° C. and at a pressure in the range of from about 15 to about 1,000 pounds per square inch in a medium having a pH greater than 7 in the presence of a hydrogenation catalyst comprising palladium composited on charcoal, and recovering the desired o-phenylenediamine.

Other objects and embodiments will be found in the following further detailed description of this invention.

In order to avoid the use of organic solvents for reasons hereinbefore set forth, the reduction of o-nitroaniline was attempted by utilizing an aqueous medium. Inasmuch as ortho-phenylenediamine has an appreciable water solubility, an initial two-phase liquid system was utilized by operating above about the melting point of o-nitroaniline and employing a sufficient amount of water to completely dissolve the reduction product at this temperature. A hydrogenation catalyst comprising palladium composited on carbon was used and the reduction effected at a pressure of from about 15 to about 60 pounds per square inch. Although about the theoretical amount of hydrogen was adsorbed, the results were unexpectedly poor. The reaction mixture was discolored, being orange to tan in color, and contained a relatively small amount of a water-insoluble, dark brown, oily material which occluded the catalyst and prevented the recovery and the reuse thereof. The presence of the water-insoluble by-product, which is hard to separate, therefore seriously interferes with the isolation and purification of the desired product and prevents the recovery and reuse of the catalyst.

However, it has now been unexpectedly found that the desired products comprising o-phenylenediamines may be recovered in a greater yield and higher purity by effecting the reduction of o-nitroanilines in the presence of certain catalytic compositions of matter in an alkaline medium, that is, an aqueous medium having a pH greater than 7 and preferably greater than 9. By utilizing this aqueous alkaline medium, reduction is effected by utilizing relatively low hydrogen pressures, i.e., from about 15 to about 60 pounds per square inch, relatively low temperatures, i.e., from about 70° to about 100° C. with a corresponding recovery of pure colorless products in yields in excess of 95%. However, higher pressures up to about 500 pounds per square inch or more may also be used with equivalent results.

The catalysts which are employed in the process of this invention for effecting the reduction of o-nitroanilines to form o-phenylenediamines comprise metals selected from the noble metals of Group VIII of the Periodic Table, the preferred metals comprising platinum and palladium, although it is contemplated within the scope of this invention that other noble metals such as rhodium, ruthenium, osmium and iridium may also be used, although not necessarily with equivalent results. The metals may be used per se, as their oxides or in the preferred embodiment of the invention, composited on a solid support, a particularly effective support comprising charcoal. When utilizing the alkali medium, that is, a medium having a pH greater than 7 and preferably greater than 9, to effect the reduction, it has been found that some other catalysts which normally act as hydrogenation catalysts do not permit the recovery of the desired product in as great a yield or with as great purity, said ineffective catalysts including Raney nickel.

As hereinbefore set forth, the reduction is effected at reducing conditions, said conditions including a temperature within the range of from about 70° to about 100° C., a pressure ranging from about 15 to about 1,000 pounds per square inch and a pH greater than 7. The desired pH is obtained by adding relatively small amounts of alkaline reacting substances including sodium hydroxide, potassium hydroxide, lithium hydroxide, sodium carbonate, potassium carbonate, ammonia, etc. When effecting the reaction, it is desirable to have a sufficient amount of water present so that a saturated solution of the orthophenylenediamine at the reaction temperatures employed is obtained. When using this amount of water, it is possible to filter out the catalyst while the solution is still hot, thereby recovering the catalyst for reuse without any diminution of activity. The desired product will crystallize out of the solution upon cooling thereof and may then be recovered. In addition, inasmuch as o-phenylenediamines have an extreme sensitivity toward air oxidation, it is desirable to add an oxidation inhibitor to the solution during the cooling period to prevent discoloration of the desired product, one such inhibitor being sodium hydrosulfite. It is also advantageous to operate the system under a relatively inert atmosphere such as nitrogen. While the present specification is directed mainly to the preparation of o-phenylenediamine by the hydrogenation of o-nitroaniline, it is also contemplated within the scope of this invention that substituted o-nitroanilines which contain groups such as alkyl, halo and alkoxy radicals which are not subject to reduction may also be treated in a similar manner to prepare substituted o-phenylenediamines.

The process of this invention may be effected in any suitable manner and may comprise either a batch or continuous type of operation. For example, when a batch type operation is used, a quantity of the o-nitroaniline, water, sufficient alkali such as sodium hydroxide to give a pH greater than 7 and preferably greater than 9 along with the catalyst such as palladium composited on charcoal, is placed in an appropriate apparatus such as a shaking or stirred autoclave. Hydrogen is pressed in until an initial desired pressure has been reached. The autoclave and contents thereof are then heated to the desired reaction temperature and maintained thereat with agitation until the theoretical amount of hydrogen is absorbed whereupon no further hydrogen is taken up and the reaction ceases. At the end of this time the excess pressure is vented and the hot solution is subjected to filtration, preferably under an inert atmosphere, to remove the catalyst. An oxidation inhibitor such as sodium hydrosulfite, etc. is then added and the solution is cooled. The o-phenylenediamine precipitates out upon cooling and is recovered by filtration. The mother liquor is reduced by conventional means such as distillation, etc., cooled and the additional product which crystallizes out is recovered in a manner similar to that set forth above.

It is also contemplated within the scope of this invention that the preparation of o-phenylenediamines by the reduction of o-nitroanilines may also be effected in a continuous manner, although not necessarily with equivalent results. For example, when a continuous type operation is used, the starting material comprising the o-nitroaniline is continuously charged to a reaction zone which is maintained at the proper operating conditions of temperature and pressure and which contains the desired hydrogenation catalyst. The water and alkali may be charged through separate lines or, if so desired, may be admixed with the o-nitroaniline prior to introduction into the zone and the resulting mixture charged thereto in a single stream. Hydrogen is pressured in through separate means and after a desired residence time, the reactor effluent is continuously withdrawn, cooled and the desired product recovered by filtration in a manner similar to that hereinbefore set forth. Due to the nature of the catalyst employed, a particularly effective continuous type of operation comprises a fixed bed method in which the o-nitroaniline passes through a fixed bed of catalyst in either an upward or downward flow. Another continuous type of operation which may also be used includes the slurry type operation in which the hydrogenation catalyst is carried into the reaction zone as a slurry in either the o-nitroaniline or water medium.

The following examples are given to illustrate the process of the present invention which, however, are not intended to limit the generally broad scope of the present invention in strict accordance therewith.

*Example I*

In this example a mixture of 55.6 grams (0.4 mole) of a commercial grade of o-nitroaniline, 120 grams of water, 0.5 gram (0.0125 mole) of sodium hydroxide and 0.6 gram of a hydrogenation catalyst comprising 5% palladium composited on carbon was charged to a low pressure hydrogenator. The system was sealed, flushed with hydrogen and heated to a temperature in the range of from about 70° to about 90° C. Following this hydrogen was pressed in at about 60 pounds per square inch of pressure. The theoretical amount of hydrogen was absorbed after a period of about 5 hours during which time the hydrogenator was maintained at the above temperature range. At the end of 5 hours the uptake of hydrogen ceased. However, the system was maintained for an additional hour at a temperature range of from about 70° to about 90° C. under hydrogen pressure to insure completion of the reaction.

The excess pressure was vented, the hydrogenator opened, following which 0.5 gram of an oxidation inhibitor comprising sodium dithionite dissolved in 10 grams of water was added to the mixture. The practically colorless solution was filtered while still hot to remove the catalyst. It should be noted that in this experiment no attempt was made to recover the catalyst for reuse inasmuch as the catalyst is inactivated by the addition of the sodium dithionite. However, it is possible to recover the catalyst by filtration before addition of the oxidation inhibitor and thereafter reuse the catalyst in subsequent runs. Following this the solution was cooled by external means to a temperature in the range of from about 0° to about 5° C. during which time the o-phenylenediamine crystallized out as practically colorless crystals. The crystals were filtered and washed twice with 25 grams of ice water which also contained a small amount of sodium dithionite. The crystals were dried under vacuum. The mother liquors plus the washes were reduced by distillation to 38 grams following which the mother liquor was cooled using a temperature of from 0° to 5° C. An additional amount of o-phenylenediamine crystallized out, said crystals being filtered, washed twice with 10 grams of cold water and dried under vacuum. The first crop of crystals amounted to 36.5 grams (84.5% of theory) while the second crop of crystals amounted to 5.0 grams (11.5% theory). The percent of yield based on the first and second crop of crystals amounted to 96% of theory. The physical properties of these crystals were comparable with the standard commercial grade of o-phenylenediamine.

*Example II*

In this example a solution comprising 55.6 grams (0.4 mole) of a commercial grade of o-nitroaniline, 120 grams of water, 0.5 gram of sodium hydroxide and 0.8 gram of a hydrogenation catalyst comprising 5% platinum composited on charcoal was charged to a low pressure hydrogenator. The hydrogenator was sealed, flushed with hydrogen and heated to a temperature of about 70°–90° C. Hydrogen was then pressured in until an initial pressure of 60 pounds per square inch was attained and the hydrogenator maintained at the above condition of temperature for a period of 5 hours. At the end of 5 hours the uptake of hydrogen had stopped; however, the apparatus was maintained for an additional period of 1 hour under identical conditions to insure completion of the reaction.

At the end of this additional hour, the excess pressure in the hydrogenator was vented, the reaction product was recovered, 0.5 gram of sodium dithionite dissolved in 10 grams of water was added to prevent discoloration of the o-phenylenediamine and the mixture filtered to separate the catalyst. The filtrate was cooled by means of an ice bath to about 5° C. and the resulting practically colorless crystals were separated by filtration. The mother liquor was treated in a manner similar to that set forth in Example I above and the resulting crystals were again recovered by filtration. The recovery of the desired o-phenylenediamine amounted to 90% of theory.

Example III

To show the necessity for the presence of an alkaline medium another experiment was run in which 55.6 grams of a recrystallized, pure grade o-nitroaniline and 120 grams of water along with 0.6 gram of a hydrogenation catalyst comprising 5% palladium composited on charcoal were placed in a low pressure hydrogenator. The hydrogenator was sealed, flushed with hydrogen, heated to a temperature of about 70° to 90° C. and hydrogen pressed in until an initial pressure of 60 pounds per square inch was reached. Absorbtion of hydrogen ceased in about 5 hours following which the hydrogenator was maintained at the above condition of temperature for an additional period of 1 hour. The excess pressure was vented, the reaction mixture was removed from the hydrogenator, found to be discolored and contained a dark water-insoluble oil which occluded the catalyst. On cooling the product separated in poorly formed discolored crystals. Great difficulty was experienced in attempting to isolate a satisfactory crystalline product from this reaction mixture.

Example IV

In this example the catalyst which was used in the hydrogenation reaction was varied, said catalyst comprising Raney nickel. A solution of 55.6 grams (0.4 mole) of ortho-nitroaniline, 120 grams of water, 0.5 gram of sodium hydroxide and 5.5 grams of Raney nickel was placed in a hydrogenator and treated in a manner similar to that set forth in the above examples. However, the rate of reduction was too slow for practical purposes and the reaction was discontinued after a period of about 16 hours, the rate of reduction being shown by a continual uptake of hydrogen.

A similar experiment using a similar finely divided commercially available nickel catalyst as the hydrogenation catalyst under identical conditions as those hereinbefore set forth proved ineffective, no hydrogen being absorbed during the reaction period.

Similar runs using ammonia and sodium carbonate as alkaline substances in place of sodium hydroxide and another run using pressures up to about 600 pounds per square inch gave results which were similar to those set forth in Examples I and II. In addition, a catalyst which was separated from the reaction mixture prior to addition of the sodium dithionite has been reused in four successive hydrogenation reactions without diminution of activity.

As shown by the above examples, a desired product, in this case, comprising o-phenylenediamine may be obtained in high yields (95% of theory) and in relatively high purity as colorless to light tan crystals when utilizing certain reducing conditions. These conditions include a relatively low temperature of from about 70° to 100° C.; a relatively low pressure ranging from about atmospheric to about 60 pounds per square inch or, if desired, up to about 1000 pounds per square inch; and an aqueous alkaline medium having a pH greater than 7 and preferably greater than about 9. This is in contradistinction to a reducing process employing an aqueous medium which is neutral or has a pH of less than 7. The reaction mixture which is obtained thereby is discolored and contains water insoluble tarry by-products which prevent recovery of the catalyst for reuse and from which isolation of a satisfactory quality o-phenylenediamine is very difficult, time consuming, and costly.

I claim as my invention:

1. A process for the production of an o-phenylenediamine which comprises treating an o-nitroaniline with hydrogen at a temperature in the range of from about 70° to about 100° C. and at a pressure in the range of from about 15 to about 1000 pounds per square inch and while suspended in an inorganic aqueous medium having a pH greater than 7 in the presence of a noble metal selected from the group consisting of platinum and palladium, said medium containing sufficient water to dissolve the resultant o-phenylenediamine at the reaction temperature, cooling the solution thus formed sufficiently to crystallize the o-phenylenediamine out of the solution, and recovering the o-phenylenediamine crystals.

2. A process for the production of o-phenylenediamine which comprises treating o-nitroaniline with hydrogen at a temperature in the range of from about 70° to about 100° C. and at a pressure in the range of from about 15 to about 1000 pounds per square inch and while suspended in an inorganic aqueous medium having a pH greater than 7 in the presence of palladium, said medium containing sufficient water to dissolve the resultant o-phenylenediamine at the reaction temperature, cooling the solution thus formed sufficiently to crystallize the o-phenylenediamine out of the solution, and recovering the o-phenylenediamine crystals.

3. The process of claim 2 further characterized in that said palladium is composited on charcoal.

4. A process for the production of o-phenylenediamine which comprises treating o-nitroaniline with hydrogen at a temperature in the range of from about 70° to about 100° C. and at a pressure in the range of from about 15 to about 1000 pounds per square inch and while suspended in an inorganic aqueous medium having a pH greater than 7 in the presence of platinum, said medium containing sufficient water to dissolve the resultant o-phenylenediamine at the reaction temperature, cooling the solution thus formed sufficiently to crystallize the o-phenylenediamine out of the solution, and recovering the o-phenylenediamine crystals.

5. The process of claim 4 further characterized in that said platinum is composited on charcoal.

6. A process for the production of an o-phenylenediamine which comprises treating an o-nitroaniline with hydrogen at a temperature in the range of from about 70° to about 100° C. and at a pressure in the range of from about 15 to about 1000 pounds per square inch and while suspended in an inorganic aqueous medium having a pH greater than 7 in the presence of a noble metal selected from the group consisting of platinum and palladium, said medium containing sufficient water to form a saturated solution of the resultant o-phenylenediamine at the reaction temperature, cooling said solution sufficiently to crystallize the o-phenylenediamine out of the solution, and recovering the o-phenylenediamine crystals.

References Cited by the Examiner

UNITED STATES PATENTS

| | | | |
|---|---|---|---|
| 2,194,938 | 3/1940 | Henke et al. | 260—580 XR |
| 2,233,128 | 2/1941 | Henke et al. | 260—580 XR |
| 2,311,054 | 2/1943 | Kenyon et al. | 260—580 |
| 3,051,753 | 8/1962 | Dietzler et al. | 260—580 |
| 3,063,980 | 11/1962 | Bloom et al. | 260—580 |
| 3,067,253 | 12/1962 | Dietzler et al. | 260—580 XR |

CHARLES B. PARKER, *Primary Examiner.*